Jan. 28, 1964   H. E. BACH   3,119,289
METHOD FOR PLANISHING A PAIR OF SEAM-JOINED METAL SHEETS
Filed July 1, 1960

INVENTOR.
HAROLD E. BACH
BY Woodhams Blanchard and Flynn
ATTORNEYS

United States Patent Office 3,119,289
Patented Jan. 28, 1964

3,119,289
METHOD FOR PLANISHING A PAIR OF
SEAM-JOINED METAL SHEETS
Harold E. Bach, Bay City, Mich., assignor to National Electric Welding Machines Co., Bay City, Mich., a corporation of Michigan
Filed July 1, 1960, Ser. No. 40,287
5 Claims. (Cl. 80—5.1)

This invention relates to metal fabrication and controls particularly a method for planishing a pair of seam-joined metal sheets, as seam-welded sheets, to provide at least one smooth side.

The particular problem giving rise to the present invention arose in connection with electrical-resistance seam welding of overlapped materials. It will accordingly be convenient, in the hereinafter appearing discussion, to use terminology appropriate to this type of welding in describing the invention, its objectives and purposes, and the steps and apparatus by which these objectives and purposes are accomplished. However, it will be recognized that both the problem and its solution are common to other methods of seam-joining of material, whether lap-joining or butt-joining, and that the process will be applicable to a variety of specific joining methods.

The problem herein considered arises where at least two sheets of material, usually weldable material such as steel, are seam-joined in such a manner that the joint is thicker than the adjacent material and thereby leaves an irregularity on either or both sides of the joined sheets. For example, where two sheets of material are lap-welded in making a product such as a water tank, it is desirable that the corresponding surfaces of at least one side of each of said sheets be smoothed into a single plane in order that the lining of the tank, such as glass or vitreous enamel, can be applied and a smooth interior obtained. Where two sheets are butt-joined by either resistance or arc-welding techniques, the problems are somewhat less severe, inasmuch as the corresponding surfaces at one side of the joined sheets are approximately in a common plane, but since the weld line itself is not entirely smooth, the problem still remains to at least a limited degree.

A variety of techniques have been developed in the past for meeting this situation. Some of these techniques involve rolling, which may be either cold or hot, between a pair of smooth rolls. This is only partially satisfactory at best inasmuch as the displaced metal from the weld zone often forms into an irregular or rippled surface instead of the desired smooth surface. Further, even where the rippling effect is reduced to an acceptable point, this technique often feathers out one or both of the adjacent and lapped edges. These feathered edges may, and often do, extend beyond the welded zone and therefore do not adhere properly during subsequent processing of the sheets, such as during the applying of a vitreous enamel coating. This method also, because of its great displacement of metal in the weld zone, requires pressures which in some instances are very great and may require correspondingly heavy equipment. This is often uneconomical and is particularly so where the usage is such that only one side of the welded sheets needs to be smoothed.

Other planishing techniques involve rolling between a pair of rolls of which one is smooth and the other is grooved. The groove is to provide a space into which the welded material on one side of said sheets may be received and thereby avoid undue flattening and consequent feathering of the welded material on the other side of said sheets. This is particularly adapted to arc welding where the weld bead is received into said groove. This, however, requires accurate alignment of the weld zone, whether a lap or butt weld, within the center of the groove and is therefore difficult to control.

Accordingly, the major objects of the invention are:
(1) To provide a method for processing a pair of seam-joined sheets for producing a smooth, unrippled, blending of one side of one of said sheets with the corresponding side of said other of said sheets.
(2) To provide a method, as aforesaid, of planishing which will not effect excessive feathering of the metal on the surfaces so treated.
(3) To provide a method, as aforesaid, of planishing which can be provided as desired and convenient according to other requirements either immediately after the welding operation while the metal is still hot or substantially thereafter when the metal is cold.
(4) To provide a method, as aforesaid, which can be carried out at materially less pressures than are required when both sides of the seam are rolled smooth as above mentioned.
(5) To provide a method, as aforesaid, which can be carried out by means not requiring the precise alignment required by the method above mentioned utilizing a grooved roller.
(6) To provide a method, as aforesaid, which can be carried out by simple mechanism and which mechanism may occupy a variety of different forms according to the requirements of a specific operation.

Other objects and purposes of the invention will be apparent to persons acquainted with processes of the general sort upon reading the following specification and inspection of the accompanying drawings.

In the drawings:
FIGURE 1 in parts (a), (b) and (c) thereof show representations of three pairs of sheets seam-joined by three common forms of welding.
FIGURE 2 is a schematic illustration of the practice of my invention.
FIGURE 3 is a section taken on the line III—III of FIGURE 2.
FIGURE 4 is a section taken on the line IV—IV of FIGURE 2.
FIGURE 4a is a section corresponding to FIGURE 4 and illustrating the corresponding results obtained by a method of the prior art.
FIGURE 5 is a section taken on the line V—V of FIGURE 2.
FIGURE 6 is a top plan view of two seam-joined sheets processed according to the method of the invention and using a roller of one configuration.
FIGURE 7 is a top plan view of two seam-joined sheets processed according to the method of the invention and using a roller of a different configuration.
FIGURE 8 shows an alternate pattern of grooving of the roller 14 wherein the surface of the roller is unwrapped and laid in a plane for better illustration of the pattern of grooving.

*General Description*

In general, the invention consists of imposing a uniform first force on one pair of corresponding surfaces adjacent the seam and opposing said uniform force by a second force applied to closely spaced but distinct zones on the opposite surfaces adjacent the seam. The forces crush the material but the spacing of the zones of application of the second force permits displaced material to flow therebetween through the resulting differential pressures and thereby facilitate the yielding of the material to the uniform first force.

This process can be carried out by crushing the weld zone between a pair of rollers, one thereof being smooth and the other thereof having small channels arranged in the periphery thereof, said channels being arranged in an at least partially axial direction and opening through the axial surfaces of said roller. The smooth roller is caused to bear against the surfaces of the welded sheets which are to be finished into a smooth coplanar relationship and the grooved roller is on the opposite side thereof. Such grooving may normally be provided by knurling in any convenient pattern which meets the conditions aforesaid. The axially opening channels in the knurled roller permit the metal displaced from within the weld zone by the smooth roller to flow sidewardly and thereby accomplish the purposes desired without incurring the disadvantages above noted for the conventional processes of planishing a seam weld.

*Detailed Description*

In the following description of the process illustrating and embodying the invention, reference will for convenience be made to certain specific mechanism by the use of which said process is advantageously practiced. However, it will be recognized that the specific mechanism to which reference is made is only one of many mechanisms which can be used and accordingly reference to such mechanism is for illustrative purposes only and is in no sense limiting.

Figure 1:
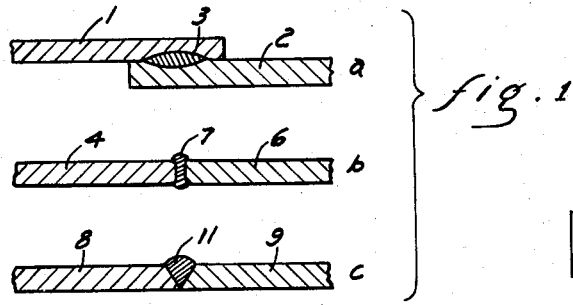

Referring first to FIGURE 1, there are shown three common forms of seam welds to which the present invention is applicable. These are merely illustrative and are submitted for showing the versatility of the process and with no intention of limiting the applicability of the process to only these particular types of welds. In FIGURE 1a there is shown a common lap weld between sheets 1 and 2 with the weld zone indicated at 3. In FIGURE 1b there is shown a butt weld between sheets 4 and 6 with the weld zone indicated at 7. In FIGURE 1c there is shown an arc weld between sheets 8 and 9 with the weld zone and weld metal indicated at 11.

The following discussion will assume that the planishing operation is to be performed on the lap weld as shown in FIGURE 1a and such a weld will be assumed for purposes of illustration. However, it will be recognized that other seam welds can be similarly dealt with, including those welds shown in FIGURES 1b and 1c, provided only that suitable pressure applying means can be applied to both sides thereof.

Figure 2:
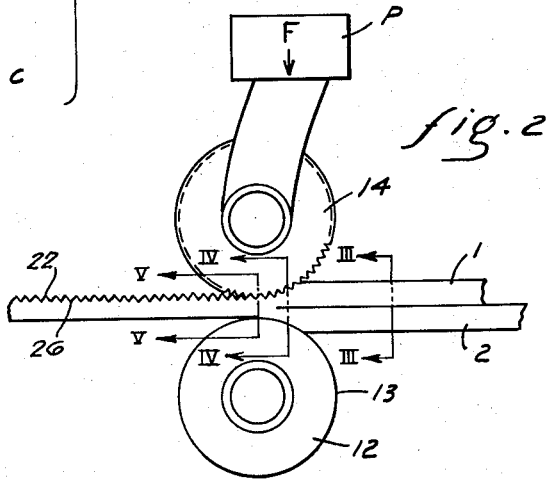
Figure 8:
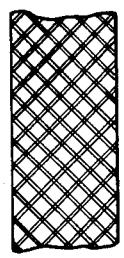
Figure 3:
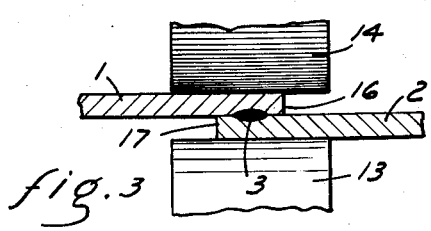
Figure 5:
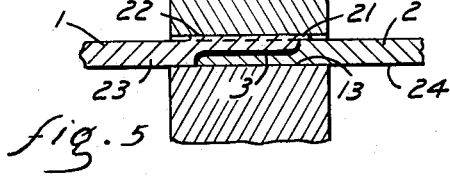
Figure 7:
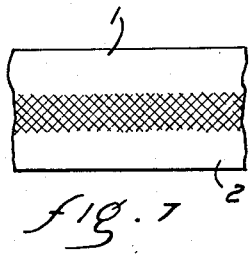

With the sheets 1 and 2 welded together by a suitable lap weld, suitable pressure-applying devices, preferably rollers, are provided for bearing against both the upper and lower sides of the weld zone. Assuming that the lower sides of the sheets 1 and 2 are the sides which it is desired to render smooth and coplanar, the lower roller 12 will have a smooth peripheral surface as indicated at 13 in FIGURES 2, 3 and 5. The upper roller, whose axis is preferably parallel with the axis of the lower roller, will be grooved in some pattern by which the grooves open through the axial walls of the upper roller 14. Such grooving may be any of several possible patterns. In FIGURES 2 and 3 there is shown a grooving wherein the grooves are parallel with the axis of the roller 14 and open outwardly through the axial ends of the roller. In FIGURES 7 and 8 there is shown another acceptable pattern for such grooving wherein the grooves are arranged in a cross-hatched manner but wherein each individual groove still communicates at both of its ends to the axial ends of the roller.

The rollers 12 and 14 are supported in any convenient manner, not shown, by which they exert enough pressure F by means P against the metal to work the weld zone into the desired shape.

Figure 4:
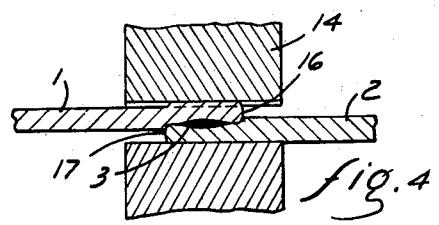
Figure 4A:
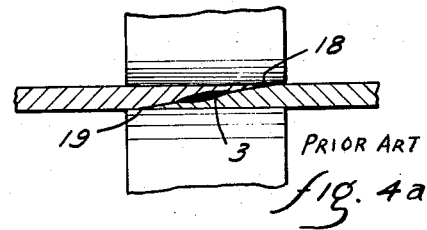

As the rolls commence working the seam portion of the metal, the zone immediately to the right (as appearing in FIGURE 2) of the rolls will appear as shown in FIGURE 3 looking in the direction of the arrows associated with the line III—III of FIGURE 2. Upon reaching the lines IV—IV of FIGURE 2, the rollers have partially crushed the metal and produced a condition as shown in FIGURE 4. Here the free ends 16 and 17 of the overlapped sheets have commenced to move outwardly in response to the pressure of the rolls and each of the overlapped portions has commenced to press in on the other thereof to form somewhat of a ship-lap arrangement. If both of said rollers were smooth, a condition would develop which not only develops the undesired rippling above mentioned, but also, as shown in FIGURE 4a, wherein the edges of the overlapped metal become feathered out, as indicated at 18 and 19. It is these thin edges which in the past have often caused trouble because they usually extend beyond the weld zone indicated at 3 and accordingly are not fastened to the adjacent metal of the opposite sheets. Thus, these feathered out edges often bend away from the adjacent sheet and will spoil the smoothness and coplanar character sought to be obtained. Particularly, where the sheets so treated are subsequently surfaced, as by paint or by a glazing of a ceramic material, the feathered edges may, and often do, represent a point of weakness which sometimes later breaks out and causes undesired grooving or scoring within the tank which would otherwise be smooth. Such irregularities in some instances have in the past at best required especial care in cleaning and in some instances where especially clean conditions are required, such irregularities may render the tank unavailable for continued use. Accordingly, the process of the invention, by providing the grooves above mentioned in the upper roller 14, causes the extra metal in the overlapped portions of the sheets 1 and 2 to move upwardly into the grooves provided in said upper roller and thence move axially outwardly. Thus, if there is any appreciable flow or displacement of metal, it will be forced upwardly, into said grooves and then laterally to form projections or ridges 22. This controlled escape of metal from the weld zone permits the smooth side of the seam to be truly smooth and unrippled. Further, although the end of projection 22 may overlap and be unconnected to the adjacent surface of sheet 2, since it is on the side which will be untreated by further processing, no harm is done. Instead the weld zone 3 will here extend substantially to the surfaces 23 and 24 of the sheets 1 and 2, respectively, and even if the weld nugget does not extend all the way to the adjacent surfaces 23 and 24, the metal in each of the portions adjacent such surfaces is usually sufficiently thick that the thin feathered out edges above referred to are avoided and the problem resulting from said feathered edges is avoided.

It will be evident that the rollers may travel along a welded seam or that the material may be fed between rollers having fixed supports according to the type of operation involved and according to convenience under the particular circumstances wherein said process is being practiced. Further, it will be recognized that the manner by which the force F is applied to the rollers 12 and 14 is likewise a matter of choice and is no part of the present invention.

Figure 6:
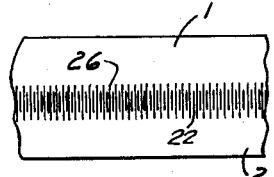

In the actual practice of the invention, the smooth side of the sheet, as represented by the surfaces 23 and 24 of the sheets 1 and 2, is not only unrippled, but is also otherwise virtually unmarked and the line of discontinuity therebetween is often entirely invisible to the naked eye. On the other hand, the opposite side of said sheets 1 and 2 are provided with a series of transverse projections 22 separated by grooves 26 (FIGURES 2 and 6) showing the displacement of the metal and its entry into the channels formed in said upper roller.

When the process is applied to other types of seam weld such as those shown in FIGURES 1b and 1c, the same procedure will take place excepting that there is less metal to be displaced and accordingly the displacement will be considerably less violent than in the case of the lapped seam shown in FIGURE 1a.

FIGURE 7 shows a corresponding view of the track left by a roller which was provided with cross-hatched grooves of the type shown in FIGURE 8.

While it will be apparent that less pressure will be required on the rollers if the planishing process is carried out while the metal is sufficiently hot to be slightly soft, it can be carried out regardless of the temperature of the metal and in some instances certain advantages of cold working are obtained if the operation is carried out after the metal has cooled.

While a particular preferred embodiment of the invention has herein been utilized for illustrative purposes, it will be recognized that a variety of other structures can be provided utilizing the substance of the invention and accordingly the hereinafter appended claims will be interpreted as including such other structures excepting as said claims may by their own terms expressly require otherwise.

What is claimed is:

1. In a planishing process for seam-welded sheets comprising the steps: applying a pressure substantially uniformly to one surface of the area of said sheets around and including the seam and applying differential pressures at spaced zones to the opposite surface of said area, whereby to render said one side smooth and to permit excess metal from within said seam area to flow between said spaced zones and escape from said area.

2. A process of planishing sheet material having a weld seam therein, which comprises: moving the zone of said sheet material around and including said seam between a pair of peripherally opposed rollers spaced apart a distance less than the thickness of said seam, compressing said zone to urge portions on one surface of the sheet material on opposite sides of the seam into smooth relationship with respect to each other and simultaneously displacing portions of said zone on the opposite surface of the sheet material and spaced apart longitudinally along said seam into laterally open grooves in the adjacent roller whereby the excess material in said zone is permitted to escape into said grooves and it forms spaced projections on the opposite surface of the sheet material.

3. A process according to claim 2 where said sheet material is comprised of two sheets having overlapped edges, the overlapped portions thereof being displaced sidewardly with respect to the direction of movement thereof between said rollers, the overlapped portions thereby being elongated in the sideward direction and being thinned so that the portions of said sheets adjacent said seam are substantially coplanar with the remainder of said sheets.

4. A process of planishing sheet material having a weld seam therein in which the portion of said sheet material including said seam is thicker than the adjacent portions of said sheet material on either side of said seam, which comprises: applying a force on one surface of said sheet material in a zone extending on either side of and including said seam to urge the portions of said one surface on opposite sides of the seam into smooth relationship with respect to each other, simultaneously applying an oppositely directed force on the opposite surface of said sheet material at points spaced apart longitudinally of the seam in a zone extending on either side of and including said seam and displacing the material between said points into regions which open away from the seam so that said material flows in said regions and forms projections on said opposite surface of said sheet material which projections are spaced apart longitudinally along the seam and which extend transverse thereto.

5. A process of planishing sheet material having a weld seam therein, which comprises applying pressure to opposite surfaces of said sheet material in the zone around and including said seam; displacing portions on one surface of the sheet material, which portions are spaced apart longitudinally of said seam, in a direction perpendicular to said one surface to form projections on said one surface; permitting said projections to spread laterally with respect to said seam and simultaneously urging the opposite surface of the sheet material on opposite sides of said seam into smooth relationship.

References Cited in the file of this patent

UNITED STATES PATENTS

| | | |
|---|---|---|
| 1,377,266 | Mossberg | May 10, 1921 |
| 1,779,607 | Lewis et al. | Oct. 28, 1930 |
| 1,785,905 | Kerruish | Dec. 23, 1930 |
| 2,008,002 | Calkins | July 16, 1935 |
| 2,907,701 | Peart et al. | Oct. 6, 1959 |